United States Patent
Kumaki et al.

(10) Patent No.: US 6,706,820 B2
(45) Date of Patent: Mar. 16, 2004

(54) VINYL CHLORIDE RESIN COMPOSITION

(75) Inventors: Terutoshi Kumaki, Kawasaki (JP); Tsutomu Arakawa, Tokyo (JP)

(73) Assignee: Showa Denko K.K., Tokyo (JP)

( * ) Notice: Subject to any disclaimer, the term of this patent is extended or adjusted under 35 U.S.C. 154(b) by 111 days.

(21) Appl. No.: 10/110,976

(22) PCT Filed: Aug. 17, 2001

(86) PCT No.: PCT/JP01/07083

§ 371 (c)(1),
(2), (4) Date: Apr. 18, 2002

(87) PCT Pub. No.: WO02/16494

PCT Pub. Date: Feb. 28, 2002

(65) Prior Publication Data

US 2002/0188077 A1 Dec. 12, 2002

Related U.S. Application Data

(60) Provisional application No. 60/300,851, filed on Jun. 27, 2001.

(30) Foreign Application Priority Data

Aug. 21, 2000 (JP) ......................... 2000-249414

(51) Int. Cl.⁷ ..................... C08L 27/06; C08L 23/02; C08L 23/28
(52) U.S. Cl. ................. 525/213; 525/214; 525/239; 264/37
(58) Field of Search ................... 525/213, 214, 525/239; 264/37

(56) References Cited

U.S. PATENT DOCUMENTS 3,928,503 A * 12/1975 Hambsch et al. ........... 525/197
4,113,805 A * 9/1978 Frey et al. ................... 525/239

FOREIGN PATENT DOCUMENTS

| BE | 665 013 A | 12/1965 |
|----|-----------|---------|
| EP | 0 343657 A1 | 11/1989 |
| EP | 0 418 966 A1 | 3/1991 |
| EP | 0 512 566 A | 11/1992 |
| EP | 0 618 260 A | 10/1994 |
| FR | 1 571 136 A | 6/1969 |
| GB | 1 522 776 A | 8/1978 |
| JP | 54-124096 | 8/1979 |
| JP | 4-106109 | 4/1992 |
| JP | 5-195502 | 8/1993 |
| WO | WO 99/50316 A1 | 10/1999 |

OTHER PUBLICATIONS

"Testing Method for Tensile Properties of Plastics", JIS K 7113, pp. 235–251 (1981).
"Determination of Chlorine in Chlorine–containing Polymers, Copolymers and their Compounds", JIS K 7229, pp. 1293–1301 (1987).

* cited by examiner

Primary Examiner—Nathan M. Nutter
(74) Attorney, Agent, or Firm—Sughrue Mion, PLLC

(57) ABSTRACT

The present invention provides a vinyl chloride resin composition having excellent mechanical properties. The vinyl chloride resin composition comprises a chlorinated polyolefin and a resin composition containing a vinyl chloride resin and a polyolefin resin, in which 1 to 30 parts by weight of the chlorinated polyolefin is included relative to 100 parts by weight of the resin composition including 50 to 99 parts by weight of the vinyl chloride resin containing 0 to 50% by weight of a plasticizer and 1 to 50 parts by weight of the polyolefin resin, and in which the chlorinated polyolefin has a heat of fusion of 10 to 100 J/g, which is measured in accordance with a DSC method, and includes 35 to 60% by weight of chlorine in amorphous portions thereof.

12 Claims, No Drawings

VINYL CHLORIDE RESIN COMPOSITION

This is a National stage entry under 35 U.S.C. §371 of Application No. PCT/JP01/07083 filed Aug. 17, 2001, which claims benefit of Provisional Application No. 60/300, 851 filed Jun. 27, 2001; the above noted prior applications are all hereby incorporated by reference.

TECHNICAL FIELD

The present invention relates to a vinyl chloride resin composition having excellent mechanical properties.

BACKGROUND ART

Since vinyl chloride resins have excellent chemical resistance, weather resistance, and mechanical properties, they are used in various fields such as pipes, building materials, electrical wires and cables, films, or the like. In recent years, resins containing less chlorine are demanded, and thus, polyolefin resins are being studied to partially or entirely replace use of the vinyl chloride resins, in order to reduce the amount of chlorine used in fields where the vinyl chloride resins were conventionally used.

In contrast, it is difficult, in view of economic and technical problems, to completely separate mixed resins including vinyl chloride resins and polyolefin resins to recycle them for the purpose of reducing enviromental pollution. When incompletely separated resins are recycled, mechanical properties of the recycled resins are significantly decreased.

Therefore, although ethylene-vinyl acetate copolymer or chlorinated polyethylene, which are used as an impact modifier in a vinyl chloride resin composition, is suggested to be used as a compatibilizer in order to improve the mechanical properties, sufficient effects have not yet been obtained.

DISCLOSURE OF INVENTION

The present invention is achieved in view of the circumstances described above, and an object of the present invention is to provide a vinyl chloride resin composition having excellent mechanical properties, which can solve the problems described above.

The present inventors have carried out intensive research concerning the vinyl chloride resin composition including a vinyl chloride resin and a polyolefin resin and having excellent mechanical properties, resulting in the discovery that using specific chlorinated polyolefins as a compatibilizer causes improvement of the mechanical properties, and thus results in the completion of the present invention.

That is, the present invention relates to vinyl chloride resin compositions (1) to (6), methods of recycling a resin composition (7) and (8), and a compatibilizer (9), described below.

(1) A vinyl chloride resin composition comprising a chlorinated polyolefin and a resin composition containing a vinyl chloride resin and a polyolefin resin, in which 1 to 30 parts by weight of the chlorinated polyolefin is included relative to 100 parts by weight of the resin composition including 50 to 99 parts by weight of the vinyl chloride resin containing 0 to 50% by weight of a plasticizer and 1 to 50 parts by weight of the polyolefin resin, and in which the chlorinated polyolefin has a heat of fusion of 10 J/g to 100 J/g, which is measured in accordance with a DSC method, and contains 35 to 60% by weight of chlorine in amorphous portions thereof.

(2) A vinyl chloride resin composition according to (1), in which the vinyl chloride resin is a homopolymer of vinyl chloride.

(3) A vinyl chloride resin composition according to (1) or (2), in which the average degree of polymerization of the vinyl chloride resin is within a range from 300 to 2,000.

(4) A vinyl chloride resin composition according to any one of (1) to (3), in which the chlorinated polyolefin is a chlorinated polyethylene.

(5) A vinyl chloride resin composition according to any one of (1) to (4), in which the plasticizer is a phthalate.

(6) A vinyl chloride resin composition according to (5), in which the phthalate is dioctyl phthalate.

(7) A method of recycling a resin composition, comprising a step of adding a chlorinated polyolefin, which has a heat of fusion of 10 to 100 J/g, which is measured by a DSC method, and contains 35 to 60% by weight of chlorine in amorphous portions thereof, into a resin composition comprising a vinyl chloride resin and a polyolefin resin.

(8) A method of recycling a resin composition according to claim 7, wherein the resin composition comprising the vinyl chloride resin and the polyolefin resin is made from an electric cord covering material.

(9) A compatibilizer capable of forming a homogeneous mixture of a vinyl chloride resin and a polyolefin resin, comprising chlorinated polyolefin having a heat of fusion of 10 to 100 J/g, which is measured by a DSC method, and containing 35 to 60% by weight of chlorine in amorphous portions thereof.

BEST MODE FOR CARRYING OUT THE INVENTION

In the following, the present invention will be explained in detail.

Specific examples of a vinyl chloride resin capable of being used in the present invention include a homopolymer of vinyl chloride, and resins prepared from copolymerization of vinyl chloride with another monomer such as a carboxylic acid such as acrylic acid, methacrylic acid, or maleic anhydride, an ester thereof, a vinyl ester such as vinyl acetate or vinyl stearate, vinylidene chloride, ethylene, acrylonitrile, or the like. One or more monomers which can be copolymerized with vinyl chloride can be used for copolymerization with vinyl chloride. Among these vinyl chloride resins, the homopolymer of vinyl chloride is preferably used, because the mechanical properties of the homopolymer are excellent.

The copolymerization ratio of the total monomers excluding vinyl chloride is no more than 40% by weight, preferably no more than 30% by weight, relative to the total weight of the vinyl chloride resin.

The vinyl chloride resin can be produced by a conventional polymerization method such as a suspension polymerization method, an emulsion polymerization method, a bulk polymerization method, or the like.

The average degree of polymerization of the vinyl chloride resin is generally 300 to 2,000, preferably 400 to 1,800, and more preferably 500 to 1,600, in view of kneading properties, mechanical properties, and thermal stability.

The vinyl chloride resin according to the present invention may include or may not include a plasticizer. There are no limitations imposed on the plasticizer contained in the vinyl chloride resin according to the present invention, provided that it is generally known as a plasticizer for the vinyl chloride resin. Specific examples of the plasticizer include phthalate type plasticizers such as dimethyl phthalate, diethyl phthalate, dibutyl phthalate, diheptyl phthalate, di-n-octyl phthalate, di-2-ethylhexyl phthalate, isononyl phthalate, octyldecyl phthalate, diisodecyl phthalate, ditridecyl phthalate, butylbenzyl phthalate, dicyclohexyl phthalate, tetrahydrodi-n-octyl phthalate, tetrahydrodi-2-ethylhexyl phthalate, tetrahydrodiisodecyl phthalate, and the like, phosphate type plasticizers such as triethyl phosphate, tributyl phosphate, tri-2-ethylhexyl phosphate, triphenyl phosphate, tricresyl phosphate, trichloroethyl phosphate, trisdichloropropyl phosphate, tributoxyethyl phosphate, tris(β-chloropropyl) phosphate, octyldiphenyl phosphate, tris(isopropylphenyl) phosphate, cresylphenyl phosphate, and the like, aliphatic monobasic ester type plasticizers such as methyl oleate, glycerin monooleic ester, and the like, aliphatic dibasic ester type plasticizers such as dibutyl adipate, di-n-hexyl adipate, di-2-ethylhexyl adipate, diisononyl adipate, diisodecyl adipate, dialkyl adipate 610, dibutyl diglycol adipate, di-2-ethylhexyl azelate, di-n-hexyl azelate, dibutyl sebacate, di-2-ethylhexyl sebacate, and the like, dihydric alcoholic ester type plasticizers such as diethylene glycol benzoate, triethylene glycol di-2-ethylbutyrate, and the like, hydroxyester type plasticizers such as methyl acetylricinoleate, butyl acetylricinoleate, butyl phthalyl butyl glycolate, triethyl acethylcitrate, tributyl acethylcitrate, and the like, trimellitate type plasticizers such as trialkyl trimellitate (in which each alkyl group has 4 to 11 carbon atoms), tris-2-ethylhexyl trimellitate, trisoctyl trimellitate, and the like, polyester type plasticizers such as propylene glycol adipate, 1,3-butylene glycol adipate, and the like, which is produced by polymerization of a dibasic acid such as adipic acid, azelaic acid, sebacic acid, phthalic acid, or the like, with a monobasic acid such as glycol, glycerin, or the like, epoxy type plasticizers such as epoxy fatty acid ester, epoxidized fats and oils, and the like, chlorinated paraffin, 2-nitrobiphenyl, dinonyl naphthalene, o- and p-toluenesulfonamide, camphor, methyl abietate, dibutyl maleate, di-2-ethylhexyl maleate, dibutyl fumarate, and the like. Among these plasticizers, although one or more can be used, the phthalate type plasticizer is preferably used, and di-2-ethylhexyl phthalate, generally called "dioctyl phthalate", is more preferably used.

When the vinyl chloride resin composition includes the plasticizer, the content of the plasticizer is preferably no more than 50% by weight, relative to the total weight of the vinyl chloride resin composition. When the content of the plasticizer is more than 50% by weight, the mechanical properties tend to be degraded, which is not preferable.

Specific examples of the polyolefin resin capable of being used in the present invention include various homopolymers of an olefin such as polyethylene, polypropylene, poly-4-methylpentene-1 or the like, copolymers of α-olefin such as 1-butene, 1-hexene, 4-methylpentene-1,1-octene or the like with ethylene and/or propylene, ethylene-propylene copolymer, and the like. The copolymer may be either a random copolymer or a block copolymer. Among these polyolefin resins, one or a mixture including two or more can be used. Among these, a polyethylene such as high density polyethylene, low density polyethylene, linear low density polyethylene, or the like may be preferably used.

Into the polyolefin resin, a polyolefin type copolymer such as a copolymer or a graft copolymer of an olefin such as ethylene, propylene, or the like with an unsaturated dicarboxylic anhydride such as maleic anhydride, itaconic anhydride, citraconic anhydride, endobicyclo-[2,2,1]-hept-5-en-2,3-dicarboxylic anhydride or the like, a copolymer of an ethylene with an unsaturated carboxylic acid or an unsaturated carboxylic ester, such as ethylene-(meth)acrylic acid copolymer, ethylene-(meth)acrylic ester copolymer, or the like, a ethylene type ternary copolymer such as ethylene-(meth)acrylate ester-maleic anhydride copolymer, or the like may be added in accordance with an intended purpose, unless properties of the composition according to the present invention are substantially lost.

A mixing ratio of the vinyl chloride resin/the polyolefin resin is preferably within a range from 50/50 to 99/1, more preferably 60/40 to 95/5, in a weight ratio.

The chlorinated polyolefin capable of being used in the present invention can be produced by chlorinating polyolefin as a raw material. Specific examples of the polyolefin include crystalline polymers containing homopolymers such as ethylene, propylene, 1-butene, 1-pentene, 1-hexene, 4-methyl-1-pentene, or the like, copolymers of ethylene with α-olefin such as propylene, 1-butene, 1-hexene, 1-octene, 4-methyl-1-pentene, or the like, and copolymers including two or more α-olefins, and the like. The copolymer may be a random or block copolymer. Among these polyolefins, one can be individually used, or alternatively, two or more can be used together.

Among these polyolefins, polyethylene may be preferably used. That is, chlorinated polyethylene may be preferably used as the chlorinated polyolefin.

Specific examples of a method of chlorinating the polyolefin include conventional chlorinating methods such as an aqueous suspension method, a solution method, a vapor phase method, and the like. Among these method, the aqueous suspension method may be preferably used to chlorinate the polyolefin. For example, the aqueous suspension method is specifically disclosed in Japanese Unexamined Patent Application, First Publication No. Sho 54-124096, Japanese Unexamined Patent Application, First Publication No. Hei 4-106109, Japanese Unexamined Patent Application, First Publication No. Hei 5-195502, or the like.

The chlorinated polyolefin capable of being used in the present invention has a heat of fusion preferably within a range from 10 to 100 J/g, more preferably from 15 to 80 J/g, which is measured by a DSC (Differential Scanning Calorimetry) method, and contains 35 to 60% by weight, more preferably 40 to 55% by weight of chlorine in amorphous portions. When the heat of fusing crystal or the content of chlorine in amorphous portions is beyond the range described above, the mechanical properties cannot sufficiently be improved. Even more preferably, the chlorinated polyolefin has a heat of fusion within a range from 15 to 80 J/g, which is measured by DSC method, and contains 40 to 55% by weight of chlorine in amorphous portions.

The content of chlorine in amorphous portions (% by weight) is calculated according to the following formula:

$$\text{content of chlorine in amorphous portions} = X \times (290/(290-Y)) \times 100$$

wherein X (% by weight) represents the content of chlorine in all portions including amorphous portions, which is measured in accordance with a method for determining the quantity of chlorine in a resin including chlorine (an oxygen-flask combustion method), which is defined in JIS K7229, and Y (J/g) represents the heat of fusion. JIS K7229 defines a method for determination of chlorine content by means of silver-nitrate titration method or potentiometric titration method after burning chlorine containing resin in an oxygen flask under oxygen atmosphere to change chlorine contained to inorganic chlorine and then changing the chlorine into chlorine ion by letting it be absorbed in water absorbing liquid. JIS K7229 is hereby incorporated by reference.

The content of the chlorinated polyolefin is preferably within a range from 1 to 30 parts by weight, and more preferably 3 to 25 parts by weight, relative to 100 parts by weight of the resin composition including the vinyl chloride resin and the polyolefin resin. When the content is less than 1 part by weight, or more than 30 parts by weight, the mechanical strength cannot be sufficiently improved.

The chlorinated polyolefin having a heat of fusion of 10 to 100 J/g, which is measured by the DSC method, and containing 35 to 60% by weight of chlorine in amorphous portions is excellent as a compatibilizer capable of forming a homogeneous mixture of a vinyl chloride resin and a polyolefin resin. According to a method of recycling the resin composition including a step of adding the chlorinated polyolefin into the resin composition including the vinyl chloride resin and the polyolefin resin, a vinyl chloride resin having excellent mechanical properties which permit recycling can be produced, and thereby the resin composition can be recycled without separating it into the vinyl chloride resin and the polyolefin resin.

For example, an electric cord covering material in which the vinyl chloride resin and the polyolefin resin are layered or are blended can be recycled as a resin composition including the vinyl chloride resin and the polyolefin resin by using the method of recycling the resin according to the present invention.

Moreover, a conventional additive such as a processing aid, a pigment, an antioxidant, a flame retardant, a foaming agent, or the like may be added into the resin composition, unless the properties of the resin composition according to the present invention are lost.

The vinyl chloride resin composition according to the present invention may be produced by a conventional method, for example, in which the resin composition is kneaded by means of a Brabender, a mixing roller, a Banbury mixer, a kneader, an extruder, or the like.

As a polyolefin resin, the following High Density Polyethylene (referred to as "HDPE", hereinafter), Low Density Polyethylene (referred to as "LDPE", hereinafter), and Linear Low Density Polyethylene (referred to as "LLDPE", hereinafter) were used.

LDPE: Density was 0.916 g/ml, and MFR was 6.8 g/10 minutes.

LLDPE: Density was 0.920 g/ml, and MFR was 7.0 g/10 minutes.

HDPE: Density was 0.961 g/ml, and MFR was 8.0 g/10 minutes.

As chlorinated polyolefins, the following were used.

CPO1: The heat of fusion was 60 J/g, and the content of chlorine in amorphous portions was 38% by weight.

CPO2: The heat of fusion was 30 J/g, and the content of chlorine in amorphous portions was 45% by weight.

CPO3: The heat of fusion was 5 J/g, and the content of chlorine in amorphous portions was 38% by weight.

CPO4: The heat of fusion was 60 J/g, and the content of chlorine in amorphous portions was 32% by weight.

CPO5: The heat of fusion was 20 J/g, and the content of chlorine in amorphous portions was 62% by weight.

Chlorinated polyolefin resins were added to resin compositions each including the vinyl chloride resin and the polyolefin resin at ratios shown in Table 1, and were mixed by means of a Brabender, so as to produce vinyl chloride resin compositions.

The vinyl chloride resin compositions were pressed to be formed into sheets each having a thickness of 2 mm as Type 1 test pieces, and mechanical properties such as tensile strength and tensile elongation were measured at an elongation rate of 50 mm/min according to JIS K7113. JIS K7113 is hereby incorporated by reference.

Results of the mechanical properties are shown in Table 1.

TABLE 1

| | Examples | | | | | | | | Comparative Examples | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| PVC | 90 | 90 | 60 | 40 | 40 | 70 | 90 | 90 | 90 | 90 | 90 | 90 | 60 | 40 |
| DOP | | | 30 | 40 | 40 | | | | | | | | 30 | 40 |
| HDPE | | | | | | | 10 | | | | | | | |
| LDPE | 10 | 10 | 10 | 20 | 20 | 30 | | | 10 | 10 | 10 | 10 | 10 | 20 |
| LLDPE | | | | | | | | 10 | | | | | | |
| CPO1 | 5 | | | | | 10 | | | | | | | | |
| CPO2 | | 5 | 5 | 10 | 20 | | 5 | 5 | | | | | | |
| CPO3 | | | | | | | | | | 5 | | | | |
| CPO4 | | | | | | | | | | | 5 | | | |
| CPO5 | | | | | | | | | | | | 5 | | |
| Tensile Strength (MPa) | 33.5 | 34.5 | 15.2 | 4.5 | 3.8 | 28.5 | 33.8 | 35.2 | 28.5 | 26.5 | 29.7 | 29.9 | 11.5 | 2.1 |
| Tensile Elongation (%) | 80 | 90 | 280 | 120 | 140 | 75 | 80 | 85 | 35 | 60 | 45 | 40 | 200 | 50 |

EXAMPLES

In the following, the present invention will be explained in detail by way of examples.

A vinyl chloride resin (referred to as "PVC", hereinafter) which is manufactured by (Japan) Zeon Corp. (103EP; polymerization degree 1050) was used.

Dioctyl phthalate (referred to as "DOP", hereinafter) was used as a plasticizer.

INDUSTRIAL APPLICABILITY

Since the vinyl chloride resin composition according to the present invention has excellent mechanical properties, it is useful in the civil engineering and construction fields, the electric and electronic fields, household goods, and the like.

What is claimed is:

1. A vinyl chloride resin composition comprising a chlorinated polyolefin and a resin composition containing a vinyl chloride resin and a polyolefin resin, wherein 1 to 30 parts by weight of the chlorinated polyolefin is included relative to 100 parts by weight of the resin composition including 50 to 99 parts by weight of the vinyl chloride resin and 1 to 50 parts by weight of the polyolefin resin, and the chlorinated polyolefin has a heat of fusion of 10 to 100 J/g, which is measured in accordance with a DSC method, and contains 35 to 60% by weight of chlorine in amorphous portions thereof.

2. A vinyl chloride resin composition according to claim 1, wherein the vinyl chloride resin is a homopolymer of vinyl chloride.

3. A vinyl chloride resin composition according to claim 1, wherein the average degree of polymerization of the vinyl chloride resin is within a range from 300 to 2,000.

4. A vinyl chloride resin composition according to claim 1, wherein the chlorinated polyolefin is a chlorinated polyethylene.

5. A vinyl chloride resin composition comprising a chlorinated polyolefin and a resin composition containing a vinyl chloride resin and a polyolefin resin, wherein 1 to 30 parts by weight of the chlorinated polyolefin is included relative to 100 parts by weight of the resin composition including 50 to 99 parts by weight of the vinyl chloride resin containing more than 0% by weight and no more than 50% by weight of a plasticizer and 1 to 50 parts by weight of the polyolefin resin, and the chlorinated polyolefin has a heat of fusion of 10 J/g to 100 J/g, which is measured in accordance with a DSC method, and contains 35 to 60% by weight of chlorine in amorphous portions thereof.

6. A vinyl chloride resin composition according to claim 5, wherein the vinyl chloride resin is a homopolymer of vinyl chloride.

7. A vinyl chloride resin composition according to claim 5, wherein the average degree of polymerization of the vinyl chloride resin is within a range from 300 to 2,000.

8. A vinyl chloride resin composition according to claim 5, wherein the chlorinated polyolefin is a chlorinated polyethylene.

9. A vinyl chloride resin composition according to claim 5, wherein the plasticizer is a phthalate.

10. A vinyl chloride resin composition according to claim 9, wherein the phthalate is dioctyl phthalate.

11. A method of recycling a resin composition, comprising a step of adding a chlorinated polyolefin, which has a heat of fusion of 10 to 100 J/g, which is measured by a DSC method, and contains 35 to 60% by weight of chlorine in amorphous portions thereof, into a resin composition comprising a vinyl chloride resin and a polyolefin resin.

12. A method of recycling a resin composition according to claim 11, wherein the resin composition comprising the vinyl chloride resin and the polyolefin resin is made from an electric cord covering material.

* * * * *